Feb. 8, 1966  J. N. HINDE  3,234,123
METHOD OF AND MEANS FOR TREATING BODIES OF WATER
Filed Dec. 26, 1962  6 Sheets-Sheet 2

INVENTOR.
JAMES NELSON HINDE
BY
Cromwell, Greist & Warden
Attys.

Feb. 8, 1966     J. N. HINDE     3,234,123
METHOD OF AND MEANS FOR TREATING BODIES OF WATER
Filed Dec. 26, 1962     6 Sheets-Sheet 5

INVENTOR.
JAMES NELSON HINDE
BY
Cromwell, Greist & Warden
Attys.

Feb. 8, 1966 J. N. HINDE 3,234,123
METHOD OF AND MEANS FOR TREATING BODIES OF WATER
Filed Dec. 26, 1962 6 Sheets-Sheet 6

INVENTOR.
JAMES NELSON HINDE
BY
Cromwell, Greist & Warden
Attys.

United States Patent Office 3,234,123
Patented Feb. 8, 1966

3,234,123
METHOD OF AND MEANS FOR TREATING
BODIES OF WATER
James Nelson Hinde, 224 Linden Park Place,
Highland Park, Ill.
Filed Dec. 26, 1962, Ser. No. 247,264
33 Claims. (Cl. 210—7)

This invention relates, generally, to innovations and improvements in the treatment of bodies of water with air or other gas, usually for purification and related benefaction purposes. More specifically, the invention relates to innovations and improvements in the treatment of domestic and/or industrial sewage and waste for removal of impurities therefrom and/or conversion of the same to innocuous forms without creating odors or health hazards.

The present invention is a continuation-in-part of my prior co-pending application Serial No. 151,819, filed November 13, 1961 the disclosure of which is incorporated by reference herein. In said co-pending application I have disclosed preferred forms of weighted flexible tubing which are adapted to be submerged on the bottoms, or to various depths, in bodies of water such as ponds, lakes, rivers, sewage treatment lagoons, etc. Such weighted tubing is provided with special forms of slit valves whereby air, oxygen or other gases may be controllably released in the form of sized bubbles in such manner as to produce upward laminar flows of aerated water above such tubing. By laminar flow is meant upward flow with little or no turbulence. In said co-pending application, I also disclose several illustrative complete aeration systems making use of such weighted and slitted tubing fed with air from oil-less air compressor units.

While the present invention has a number of useful embodiments including several special applications in the treatment and purification of water as described below, there is one feature which is common to these various embodiments. Briefly stated, this common feature resides in disposing a plurality of submerged conduits in a body of water in a predetermined pattern wherein the conduits are generally straight and parallel to each other with suitable spacing therebetween. When air or other oxygen-containing gas is released in proper manner such as described in my co-pending application Serial No. 151,-819 along the lengths of such conduits it is possible to create and maintain an upward laminar flow of a straight curtain of aerated water above each conduit. These hydraulic curtains part in opposite directions at the surface of the body of water and then form downward recirculation currents of the water intermediate each pair of curtains whereby an entire body of water may be divided into a series of parallel, hydraulically defined, cells which are maintained so long as the upward laminar flow above each conduit is maintained.

This manner of dividing a body of water into a series of juxtaposed, parallel hydraulically defined cells is believed to constitute a new tool and technique for manipulating a body of water in the purification treatment of water with air or other oxygen-containing gas to remove or convert the sewage or waste content thereof.

An important feature of this invention is to take a relatively large body of water, such as a sewage lagoon, and divide it into a series of the above-mentioned hydraulically defined treatment cells. The body of water need not be regular in shape nor of uniform depth. Another important feature of the invention is the addition of air, oxygen, with a without, other liquid or gaseous chemicals, at various predetermined rates in such individual hydraulically defined cells, and the complete and repeated mixing of the contents of each cell for maximum biological action and digestion. Another important feature of the invention is the controlled circulation rate of such individual hydraulically defined cells so that fine, suspended solids may be kept in suspension and rotated over and over again before passing along to the next cell while in other cells, the circulation is slowed down so that suspended solids are dropped out over a large bottom area.

A further important feature of the invention is the closing off, when desired, of the opposite ends of a series of such parallel, hydraulically defined treatment cells in a body of water by creating along the opposite ends thereof hydraulic curtains of water filled with air bubbles and undergoing upward laminar flow, the bubbles emanating from submerged flexible conduits with slit valves in their upper surfaces and extending along the bottom ends of the cells. Another important feature is the vertical division of a body of water undergoing treatment into a pattern of such parallel, hydraulically defined individual treatment cells, extending downwardly from the surface, wherein there are groups of cells which vary in width and in the rate of laminar flow of their respective hydraulic defining curtains.

A further important feature of the invention is the horizontal division of a body of water into a lower anaerobic layer which is relatively quiescent and an upper aerobic layer which is non-quiescent by reason of being vertically divided into said hydraulically defined cells, with the interface between said layers being defined and maintained by reason of the hydraulic circulation of the upper layer with the absence of comparable hydraulic circulation in the lower layer. A related feature of the invention is the convenient establishment of the relative depths of such upper and lower layers by the depth to which the lengths of submerged flexible tubing with slit valves are located.

Still another important feature of the invention is to create a layer of oxygenated or aerated water over the top of a submerged layer of un-oxygenated waste water, so that anaerobic digestion may take place in the bottom layer, and before release, any of the digestion products of the anaerobic layer must pass up through the aerobic aerated layer wherein odors are removed, and solids are de-gasified and made denser, so that they will settle back down into the anaerobic bottom layer.

It will be apparent that in addition to method and process features of the invention there are also apparatus and installation features since various new and different water treatment apparatus and installations are required for practicing the invention.

In most embodiments of the invention, the distributed or dispersed fluid will be air and the body of liquid will be a body of impure water, e.g. sewage or waste stabilization lagoons, aeration tanks, the upper 10 to 15 feet of deep anaerobic ponds, the upper 5 to 10 feet of deep sludge lagoons, waste treatment ponds or tanks. However, other gases and liquids including various mixtures thereof may be distributed and dispersed in any of the various hydraulic cells undergoing treatment. Included in the additives that may be used for various cells may be acidic or alkaline substances for pH control, nitrates for control of nutrients, settling agent, chlorine in the final cells for sterilization, etc.

Among the more important uses of my present invention are: (1) The complete treatment of domestic and/or industrial sewage and waste in deep or shallow ponds; (2) the complete treatment of domestic and/or industrial sewage and waste in deep pits where the bottom of the pit is anaerobic but the top layer is aerobic, so that the rising products of the anaerobic digestion must pass up through the aerobic layer for removal of odors and the precipitation of solids; (3) the addition of cellular aeration to existing waste stabilization ponds to increase loading, to keep the ponds aerobic and working in cold climates, to change an overloaded anaerobic lagoon with odors to an aerobic lagoon without odors in the matter of one or two days, and to reduce algae and solids in the effluent to make it practical to chlorinate the effluent; (4) the polishing (i.e. final treatment) in deep or shallow lagoons or effluent from sewage or water treatment plants; (5) the aeration of activated sludge tanks; (6) the aeration of the top layer of water in deep sludge lagoons to prevent odors; (7) the aeration of aerobic fermentation; and (8) the purification of water in slow-moving streams, impoundments behind dams and intakes.

The object of the present invention, generally stated, is to achieve the above-mentioned features and uses of the invention by the provision of a new method and means of manipulating bodies of liquid, particularly water, through the use of hydraulically created and maintained, straight elongated curtains in the form of upward laminar flow of aerated or gasified liquid or water above submerged conduits formed of slitted flexible plastic tubing for releasing controlled streams of bubbles over straight elongated paths, such hydraulic curtains serving to compartmentize or subdivide the body of liquid into a plurality of hydraulically defined and maintained treatment cells wherein a body of liquid is undergoing recirculation and in which controlled aerobic treatment may be carried out.

Further objects of the invention invove utilization of such new method and means (i.e., system) of manipulating a body of water by dividing it into a plurality of hydraulically defined and maintained cells so as to accomplish the following and other related functions and purposes: to produce different types of biological reaction in the cells for the more complete removal of BOD and solids from the water; to increase oxygen uptake and bacterial reaction in activated sludge tanks; to create an aerated layer of water on top of sludge lagoons or other bodies of water undergoing anaerobic digestion to prevent odor nuisance; to create multi-stage treatment for the polishing of the effluent of conventional treatment plants; to give automatic regulation to the environment in the individual hydraulic cells so that shock loadings will have little or no effect on the final effluent, and expensive technical supervision and regulation is unnecessary; to treat the water in slow-moving rivers, impoundments behind dams, and lakes to remove BOD and add oxygen to the water; to inexpensively convert domestic and/or industrial waste and sewage into aquatic insect life which can be used to feed fish and/or birds, which can be cropped or harvested; and, to provide an aeration system wherein the air distributing elements may be readily inspected or cleaned without draining the pond or lagoon and without interrupting normal operation.

Certain other objects of the invention will in part be obvious, and will in part, appear hereinafter.

For a more complete understanding of the nature and scope of the invention reference may now be had to the following detailed description thereof taken in connection with the accompanying drawings wherein.

Figure 1:
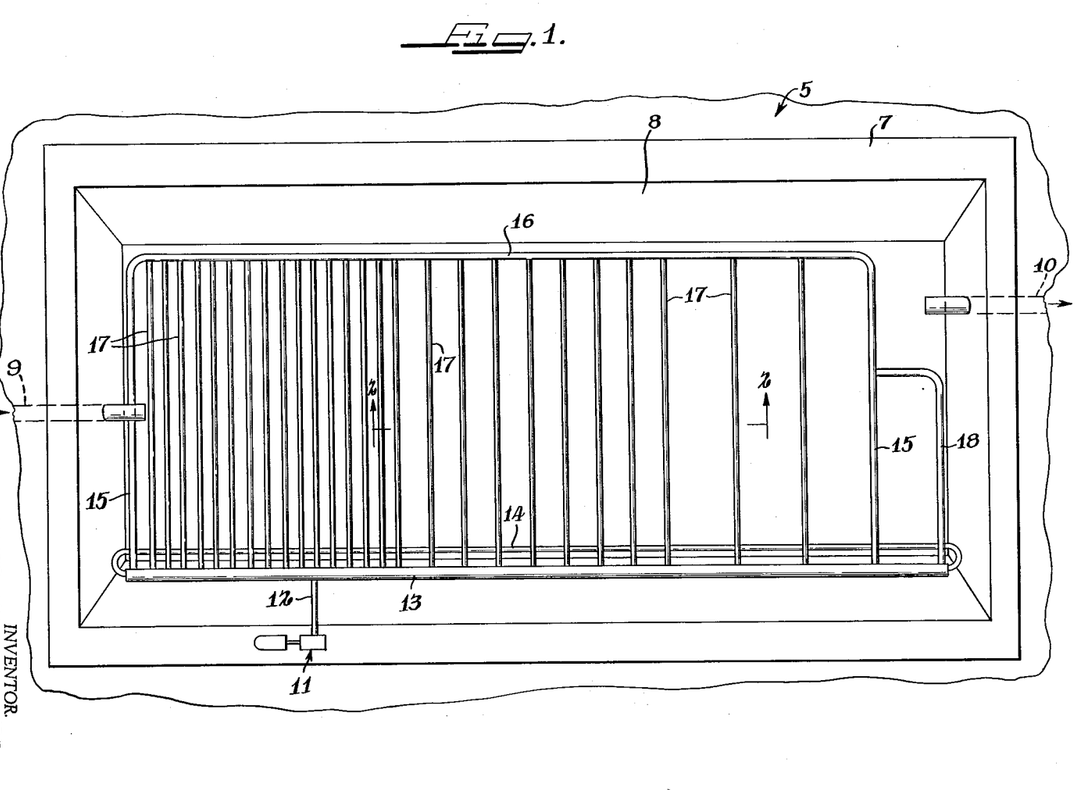
FIG. 1 is a top plan view, partly diagrammatic, of a sewage lagoon having submerged conduits installed therein in a pre-arranged pattern dividing the water in the lagoon into a series of parallel, hydraulically defined, aeration treatment cells, in accordance with the present invention.
Figure 2:
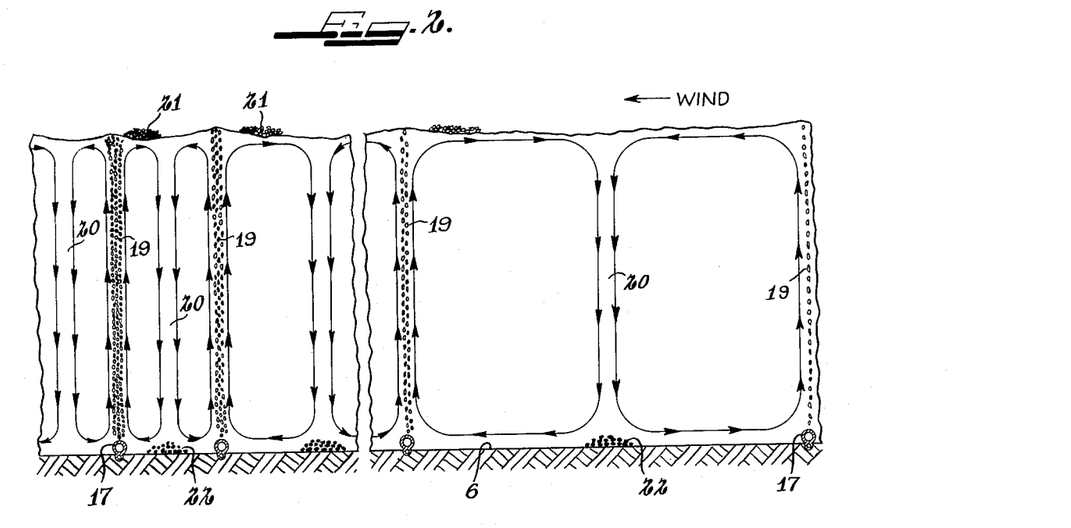
FIG. 2 is a diagrammatic, fragmentary, vertical sectional view taken on line 2—2 of FIG. 1 showing three different sized treatment cells.

Referring to FIGS. 1 and 2, a typical sewage lagoon or pond is indicated generally at 5 having a relatively level graded bottom 6 (FIG. 2) and a surrounding dike the top of which is indicated at 7. The inner faces 8 of the walls of the dike 7 are inwardly slanted to the bottom 6 in the usual fashion. The sewage or waste inlet into the lagoon 5 is indicated at 9 while the effluent outlet is indicated at 10. Preferably, the lagoon 5 is oriented so that the prevailing wind direction is from the outlet end toward the inlet end, i.e. opposite the direction of liquid flow.

The aeration system for the pond or lagoon 5 includes an oil-less air compressor or blower 11 with a feeder pipe 12 which connects the outlet of the compressor or blower 11 to a header feeder tube 13 extending along one edge of the lagoon bottom. Weighted, flexible tubing 17 having slitted check valves in the top side thereof is laid in a predetermined pattern on the bottom of the lagoon or pond 5. One length 14 of the tubing closely parallels the header 13 and is connected to the opposite ends thereof. A longer length of the tubing is also connected adjacent the opposite ends of the header 13 and arranged in end legs 15—15 and a long intermediate leg 16. Cross lengths 17—17 of the flexible tubing, spaced on different centers in three groups, extend between the header feeder tube 13 and the tubing 16. At the outlet end a partial cell is defined by an L-shaped length of tubing 18, leaving the corner into which outlet 10 extends unaerated for better settling.

Figures 7, 10, 11, 12, 14:
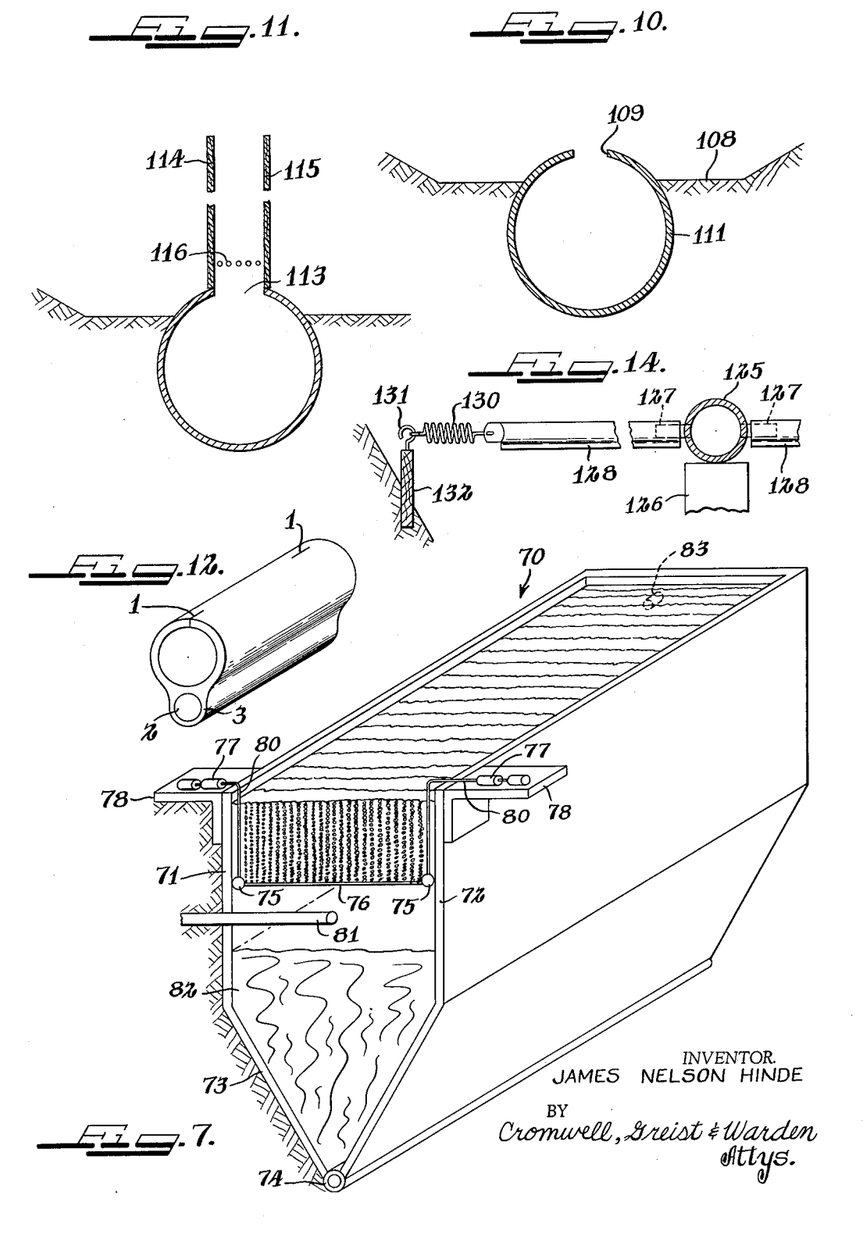
FIG. 7 is a partially diagrammatic perspective view of a sludge settling tank having the liquid in the upper portion thereof subdivided into hydraulically established aeration cells in accordance with the present invention.
FIG. 10 is a detail section on line 10—10 of FIG. 8.
FIG. 11 is a detail section on line 11—11 of FIG. 8.
FIG. 12 is a perspective end view of a short length of weighted plastic tubing slitted along the top to provide one-way, self-closing, bubble-release valves, such tubing being used as the submerged conduits in the embodiments of the invention shown in the drawings.
FIG. 14 is a detail view of an alternate arrangement for tensioning the aeration tubes.

For a detailed description of the aeration system with respect to the construction and operation of the weighted flexible tubing and the oil-less air compressor, reference is made to my said co-pending application Serial No. 151,819. The submerged, flexible, weighted tubing 14, 15, 16, 17 and 18 is provided with a series of check valves in the form of slits in the top wall thereof so that when air or other gas is introduced into the tubing under sufficient pressure, it will be released through these slit valves in the form of bubbles. A preferred form of this tubing is shown in FIG. 12 wherein the slit valves in the top of the tubing are indicated at 1—1 and the weight for the tubing in the form of lead wire is indicated at 2, encapsulated in a sheath 3 of the plastic from which the tubing is formed.

By varying the spacing and/or length of the slit valves 1—1 and the pressure of the air or other gas being distributed, there is a wide range of control and variation that can be had or obtained as to the manner and rate at which the bubbles are released. Bubbles under ⅛ of an inch diameter will have a laminar upward flow. That is the bubbles tend to rise straight up with a minimum of spreading. On the other hand, bubbles larger than ⅛ of an inch in diameter tend to have non-laminar flow. That is, they tend to rise in spirals which get larger and generally have the shape of an inverted cone. In all cases, however, the bubbles are released from the submerged tubing in such a way that, for the most part, they rise straight up above each length of tubing with a minimum of merging and an absence of turbulent flow. The resulting curtains of bubbles create an upward laminar flow of the water above each length of tubing which in effect constitutes a partition or hydraulic curtain with respect to the water on opposite sides thereof. These upward flowing hydraulic curtains of aerated water are indicated at 19—19 in FIG. 2. Where each of these hydraulic curtains having upward laminar flow reaches the surface of the water it parts or divides in opposite directions as indicated by the arrows and when two of these split or parting surface streams or currents meet intermediate the curtains 19—19, they combine and form downward currents which are indicated at 20—20.

It will be seen from FIGS. 1 and 2 that adjacent the inlet end of the pond or lagoon 5 the transverse lengths of tubing 17 are spaced closest together (e.g. on 4 foot centers) with the result that the hydraulically defined cells adjacent the inlet end are relatively narrow, i.e. approximately 2 feet wide. In the intermediate or middle portion of the lagoon 5 the submerged tubing lengths 17 are spaced farther apart (e.g. on 8 foot centers) while at the discharge or outlet end they are spaced still farther apart, e.g. on 16 foot centers. Accordingly, the hydraulically defined treatment cells are divided into three groups with respect to their widths, the narrowest group being adjacent the inlet end, the medium width group being in the middle, and the widest group of cells being adjacent the outlet end. It will be understood that there may be a smaller or larger number of subdivisions or groups of the cells as desired, but, in general the narrowest cells will be adjacent the inlet end where the most intense treatment of the water is required, while the widest cells will be adjacent the outlet end where less intensive treatment is required and slower circulation rates are desired for settling promotion purposes.

By way of specific illustration, the width of the narrowest cells may be as little as 4 inches while the width of the largest cells may be as much as 40 feet. The volume of air per linear foot of aerating tubing, may be varied from 0.1 c.f.m. to 0.005 c.f.m. per linear foot. The spacing of the air release check valves along the tubing can be varied from ⅛ inch to 96 inches, for example. The size of the check valves may be varied to produce bubbles from 1/64 to ½ inch in diameter. Thus there is wide flexibility in the aeration system and this allows the design engineer to design into each individual hydraulic cell, or group of cells, any type of oxygen uptake, circulation rate, or settling of solids, that may be required for maximum efficiency as dictated by the loading and flow rate of the waste or other pertinent factors. Furthermore, since the weighted flexible tubing 17 is not permanently held in place, the design or pattern may be changed from time-to-time if required.

It will be seen that the opposite ends of the various cells in FIG. 1 are defined or closed off by the laminar flow or curtain of aerated water continually rising from each of the long lengths of tubing 14 and 16. This provides a preferred arrangement although the closing off of the ends of the cells is not mandatory.

In FIG. 2 a greater density of bubbles is indicated over the lengths of tubing 17 in the narrowest cells at the inlet end while progressively smaller densities of bubbles are indicated over the tubing 17 in the intermediate and widest cells. This follows from the fact that considerably more air requirements are needed adjacent the inlet end where the oxygen demand is the highest. As the water being treated progresses towards the discharge or outlet end less air is required and slower circulation rates favorable to settling of fine particles are desired.

In operation in the complete purification treatment, the raw waste or sewage entering the pond or lagoon 5 through the inlet 9 will normally have a high BOD with a considerable content of large solid particles. These larger particles may be lighter and/or heavier than water. The particles that are heavier will settle to the bottom while the solids that are lighter will float. However, the accumulations of floating solids which are indicated at 21 in FIG. 2 are trapped in or confined to their respective cells even when a fairly strong wind is blowing. This is because the recirculation currents formed above each length of the air distributor tubes 17 prevent the floating solids from crossing from cell to cell at the surface and tend to entrap the floating particles 21 and carry them underneath the surface. In any event the larger floating solids 21 remain trapped in the various cells until they have become digested down to fine, suspended solids so that they can filter through the hydraulic curtains 19 created by the upward laminar flow or screen of bubbles above each length of tubing 17. The volume of floating solids 21 in the aeration cells adjacent the inlet is much larger than in the succeeding cells. As the treatment progresses continuously from cell to cell, the floating solids, mainly through digestion, become fine solids that can be carried from cell to cell. These fines are to a great extent settled in the larger cells adjacent the outlet end.

Large settlable solids 22 (FIG. 2) settle out in the bottom of each of the hydraulic cells as indicated but the surfaces of these solids are constantly washed by streams of oxygenated water which produces aerobic breakdown at the solids surfaces. If large volumes of these solids 22 are dropped out in the first inlet cells, anaerobic digestion will take place in this debris. If anaerobic methane digestion occurs, the methane, which is only very slightly soluble, will rise through the aerobic solution and will be released at the surface without detriment. Other products of anaerobic digestion which cause odors are generally soluble in water, and as they rise through the aerobic circulating water, aerobic digestion occurs to remove these odors. Anaerobic scum formations which float to the surface are broken down by the circulating water and consumed by areobic digestion, or precipitated to the bottom. These conditions are obtained and controlled by having relatively fast circulation rates in the inlet cells, with maximum release of bubbles for fast uptake of oxygen. The lengths of tubing 17 for the narrow cells at the inlet end may have closer spacing of the release check valves, larger check valves, or a combination of both. The larger check valves give larger bubbles which produce faster rise rates, which in turn give a higher velocity to the water over the tubing. However, larger bubbles decrease oxygen absorption. The circulation rate of the fluid in the cells is governed largely by the width of the cells, so normally cell width is used to govern the circulation rate. In inlet cells, closer spacing of the check valves in the submerged tubing producing small bubbles is desirable, since, while it does give slightly greater circulation rate, the main objective is to produce faster oxygen uptake to balance high inlet BOD load. At no time is it desirable to have turbulent flow in a cell except possibly for the inlet flow which will carry the effluent into several aeration cells for faster dilution and distribution of the solids. However, this same effect can be obtained mechanically by having more than one inlet pipe discharging into several different inlet cells.

The main reason for laminar or non-turbulent flow is to create well defined hydraulic curtains which in turn define and subdivide the body of liquid into separate cells. A further reason is to settle out solids which may be partially digested anaerobically without ill effects or odors and to constantly skim the heavier bottom water with higher soluble organic loading and carry it to the surface for faster aerobic digestion. Where land is a premium and the waste must be treated in a minimum area, the first few cells adjacent the inlet may be treated in turbulent flow so as to keep the activated sludge circulating, in which case, less time and space would be required for initial treatment.

The operation of the installation shown in FIGS. 1 and 2 is primarily aerobic biochemical reduction of organic matter. The influent may be, and usually is, in an anaerobic condition containing large or small solids, depending upon whether or not conventional solids and grit removal has preceded the treatment. The influent may have odor problems due to the anaerobic condition. The influence is, therefore, brought into the bottom of the introductory narrow cells with a rapid circulation to quickly dilute the influent, build up the oxygen content of the water and remove the odors. If the influent has a high BOD in excess of 300 p.p.m., it is generally necessary to divide the influent into two or more discharge connections so that the influent can be discharged into several aeration cells for faster dilution and better distribution of solids. This is also advisable with less or lower BOD in larger ponds having an inlet flow in excess of 500,000 gallons per day, or where the influent has excess solids. As the reduction of the organic matter is primarily aerobic biochemical reaction, the primary object of the installation adjacent the inlet is to build up an environment in the beginning cells which will produce the maximum aerobic material and hold this environment in a large number of the cells for maximum reduction of organic matter. An environment in cells further down the line from the influent end is created for large bacteria and animal life which consume the bacteria created in the beginning aeration cells as they are passed down the line by the circulating water. The process continues so that larger and larger animal life is produced in the cells farther from the inlet end until the water becomes pure enough to produce both animal and plant (algae) life. Further treatment, in cells closer to the outlet, produces visible aquatic insects which eat both algae and smaller animal life. This insect life can be in turn controlled by bird or fish life, which can be cropped or sold. Thus, a portion of the organic load and inorganic nutrients (e.g. nitrates, phosphates) can be removed as a saleable product. This also prevents or controls undesirable build-up of nutrients in a confined body of liquid.

To produce the different environments in the different cells, the oxygen content of the water is rapidly brought up in the beginning cells, and these cells are circulated at a rapid rate so that fast mixing occurs and fine suspended solids are circulated over and over again before they are passed along to succeeding cells. Incidentally, this passing of particles from cell to cell is continually going on in that the dividing curtains are intentionally not completely successful in preventing leakage or transmission of liquid and solids therethrough to some degree. With a continuous oxygen supply in the water and circulation to bring food and oxygen to the aerobic bacteria, the bacteria multiply very rapidly until shortly down the line of aeration cells maximum reduction of organic matter occurs. As the organic food supply is reduced, the oxygen in the water builds up and the original bacteria diminish and larger bacteria which eat the smaller bacteria, predominate. At this point, the aeration cells are widened to reduce oxygen supply and decrease circulation rate. The decreased circulation rate drops out solids and the demand for oxygen has decreased so that less air will still suffice to keep a high level oxygen content. In this oxygenated water, larger and larger animal life is produced in the larger downstream cells until visible aquatic insects appear. At this point, the aeration cells are again widened so that the very slow circulation will drop fine suspended solids. Aquatic insects thrive in this water, eating both small insects and algae that may start to produce. The water in these cells is clear (e.g. a dime can be seen at the bottom of a five-foot pond) with very little algae in the water. Some of the insect life in the larger cells is eaten by ducks and other birds, some is eaten by fish as it is discharged in the receiving stream, or the insect life may be controlled by adding minnows to the pond which could be easily cropped and sold.

In the type of operation described above in connection with the pond 5 the waste is reduced by precipitating out, biochemical reduction, and a production of larger animal life. The water is kept free of odors, acquires a clear, pleasing appearance, and the effluent is suitable for fish life. By way of more specific information, the treatment of domestic sewage where the influent ranges from 150 to 300 p.p.m. BOD, a five-foot deep pond of the type described in FIGS. 1 and 2 can handle 500 to 600 people (100 pounds BOD) per acre per day, in northern climates subject to ice. Much greater loads can be handled in warmer climates. A northern installation requires approximately 65 c.f.m. of oil-free air at 6 to 8 pounds per square inch pressure, 3250 feet of aerating tubing having twenty-six hundred $3/32$ die-formed check valves. For these conditions, the lengths of tubing 17 adjacent the inlet end would be on five foot centers, in the intermediate portions of the tank the lengths of tubing 17 would be on ten foot centers, while in the outlet end the lengths of tubing 17 would be on twenty foot centers. Hence, the hydraulically defined cells will have widths of 2½ feet, 5 feet, and 10 feet.

A ten foot deep pond can handle up to 1200 people (200 lbs. BOD) per acre per day. In cold climates subject to ice, much more can be handled than in warmer climates. Such an installation would require 100 c.f.m. of oil-free air, 5000 feet of submerged aerating tubing having 40,000 $3/32$ check valves. Inlet end tubing would be on two foot centers, intermediate section tubing would be partly on five foot and partly on ten foot centers, and outlet section tubing would be on 20 foot centers.

The foregoing arrangements will allow 73 square feet per person settling area in the five foot deep pond and thirty-seven square feet settling area in the ten foot deep. These settling areas are sufficient so that the sludge would not have to be removed for fifty years providing silt and other debris is not brought in with the raw sewage. These rates are based on 100 gallons or less flow per person per day.

In treating industrial waste which may have a BOD of 200 to 1200 p.p.m. BOD, initial digestion should be done anaerobically where practical, as will be discussed later. However, where only aerobic digestion is available, this can be handled in an arrangement such as shown in FIG. 3.

Figure 3:
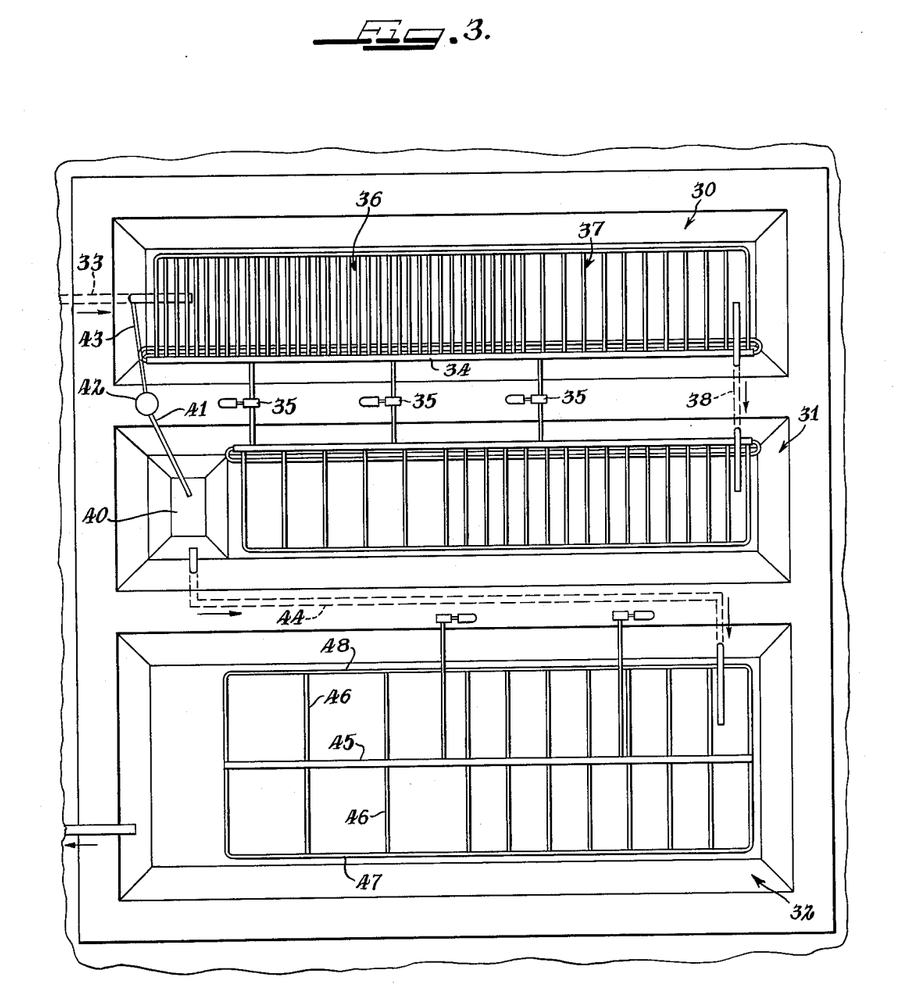
FIG. 3 is a top plan view of a sewage treatment installation for the reduction of high inlet BOD comprising three aeration lagoons subdivided into cells in accordance with the present invention and interconnected in series flow relationship and providing for recirculation of treated water and sludge to influent.

Referring to FIG. 3, three lagoons are shown in side-by-side, parallel relationship, forming one installation. The first lagoon or pond is indicated at 30, the second at 31 and the third at 32. In their over-all construction and operation the lagoons 30, 31 and 32 correspond, generally, to lagoon 5 described above in connection with FIGS. 1 and 2. Lagoon 30 has an influent pipe 33 coming into it at its inlet end, and along its inner side there is a header feeder pipe or tube 34 which connects with outlet connections of three oil-less air compressors 35—35. In general the submerged plastic tubing arrangement or pattern is the same in lagoon 30 as in lagoon 5 except that the submerged tubing in lagoon 30 is disposed in only two groups on two different centers instead of in three groups on three different centers as in lagoon 5. One group of cross tubing is indicated generally at 36 and occupies somewhat over half of the lagoon on the inlet end. The other group of wider centers is indicated at 37. The liquid from the last cell at the outlet end discharges through a transfer pipe 38 into the inlet cell of the middle lagoon 31. In the inlet end of lagoon 31 the submerged cross tubing has the same spacing or same centers as in the discharge end in lagoon 30 while in the balance of lagoon 31 the spacing of the tubing is approximately double that in the inlet end. The discharge or outlet end of lagoon 31 has a sump 40 formed therein. A suction pipe 41 dipping down into the bottom of the sump 40 connects with the inlet or suction connection of a pump 42 while the discharge connection of the pump communicates by way of a pipe 43 into the main influent inlet pipe 33. By means of this arrangement partially treated water from sump 40 may be introduced into the inlet waste thereby reducing the BOD of the influent to a value in the order of 400 to 600 p.p.m. The balance of the partially purified water from the sump 40 not withdrawn by pump 42 discharges by way of a transfer pipe 44 which extends between the ponds 31 and 32 so as to discharge into the inlet end of pond 32.

It will be noted that pond 32 is approximately twice the width of ponds 30 and 31. In view of the greater width in this installation the header feeder pipe 45 for distributing compressed air extends along the longitudinal center of the pond bottom and cross tubing 46—46 extends on opposite sides thereof so as to divide the pond 32 into the hydraulically-defined cells. It will be understood that with still wider ponds two or more headers may be used inwardly disposed from the opposite sides. The opposite ends of the cells are closed off by the curtains of aerated water rising from the submerged conduits 47 and 48. The spacing of the submerged tubing 46 is on two different centers as shown.

The ponds or lagoons 30 and 31 are sufficient to give the influent entering at 33 a two to four day retention time. The aeration cells in these two ponds are relatively narrow. Thus, the submerged tubing in the inlet end of pond 30 indicated at 36 may be placed on one foot centers while it is placed on two foot centers in the discharge half of this pond and in the inlet half of pond 31. The spacing of the cross tubing is approximately doubled in the outlet half of pond 31. The sump 40 is of sufficient size so that most of the solids and activated sludge is settled out and pumped back into pond 30.

In operation the oxygen content in the cells in ponds 30 and 31 is kept between 1 to 3 p.p.m. If the oxygen content should rise above 4 p.p.m., one or more of the blowers or compressors 35 will be shut down. On passing through the ponds 30 and 31, the BOD of the mixed waste entering pond 30 is reduced from 800 down to under 100 p.p.m. at which value the waste is discharged from the sump end of pond 31 into the polishing (i.e. final treatment) pond 32.

The same automatic control condition exists in the installation in FIG. 3 as in the pond in FIG. 1 when shock loads are put on the pond. When shock loading occurs, and it does every so often, then the environmental condition that exists in the various cells simply shifts down the line toward the outlet end of the pond. On the other hand, as the load decreases, the environmental conditions shift back toward the inlet end. The aeration cells will naturally change their environmental conditions to meet variations in the load. This multi-stage treatment can thus absorb shock loading with very little effect on the effluent and without close technical supervision being required. However, some overall supervision is required. For example, when the water warms up and biochemical reaction increases, or load materially decreases at various seasons of the year, it may be advisable to shut down one or more compressors to conserve power.

It will be understood that the primary purpose of domestic and/or industrial waste treatment is to substantially remove the impurities from the water either by biochemical reaction, by precipitation or settling out, or by a combination of these and other known removal techniques, in a manner that will not create a health hazard, odor nuisance or unsightly condition. Thus, it is not necessary to break down the organic sludge biochemically as long as it is disposed of, either temporarily or permanently under these conditions.

Figures 4, 6:
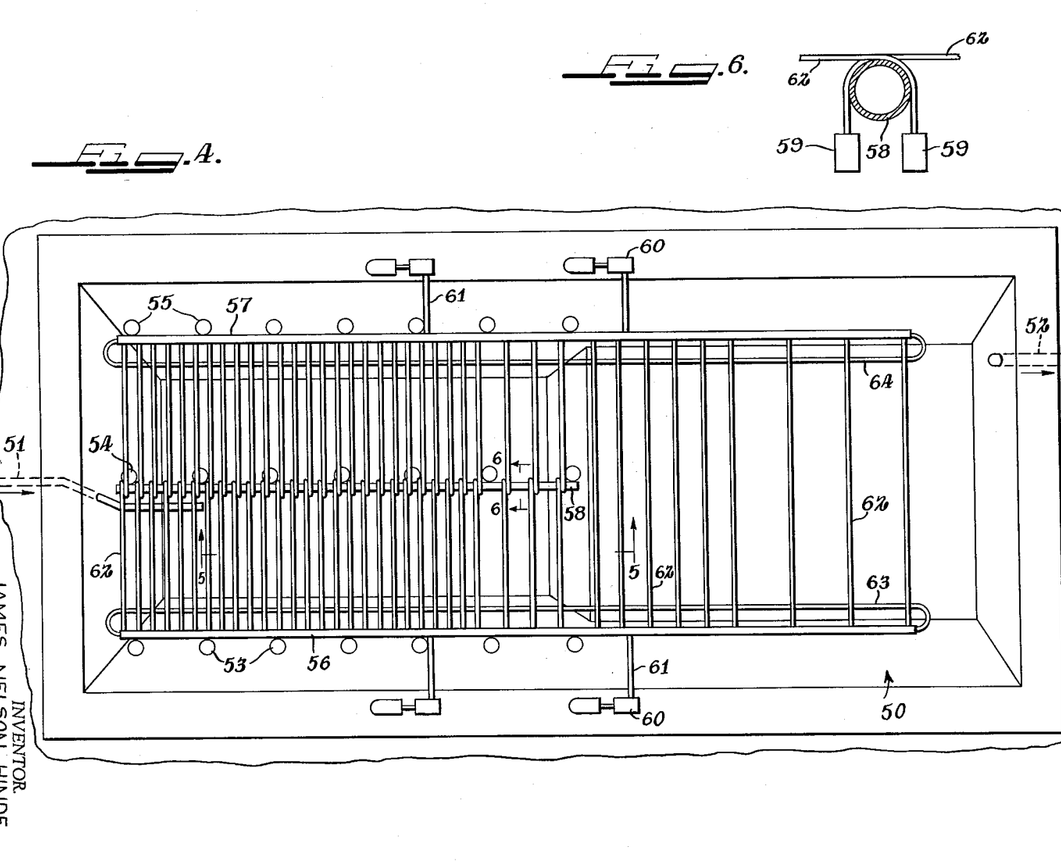
FIG. 4 is a top plan view of a sewage lagoon wherein the inlet end half is substantially deeper than the outlet end half with the entire length of the body of water, to the depth of the shallow end, being provided with an installation for aeration treatment in a series of hydraulic cells in accordance with the present invention.
FIG. 6 is a detail section taken on line 6—6 of FIG. 4.

An embodiment of the invention wherein the purification treatment is partly anaerobic and partly aerobic will be described now in connection with FIGS. 4 and 5. A single lagoon is indicated generally at 50 being provided with an influent discharge pipe 51 and an outlet effluent pipe 52. The inlet end or half of the lagoon 50 is appreciably deeper than the outlet or discharge end. Thus, the inlet end may have a water depth of 30 feet while the shallow discharge end is 14 feet deep. The cross tubing is again the submerged flexible plastic pipe with slitted outlet valves and weighted keel as above described and as shown in FIG. 12. These distributor pipes fall in three different groups depending upon the center spacing thereof, one group being adjacent the inlet end and having the closest spacing, the second group being in the intermediate portion of the pond and partly overlying the deep end and partly on the bottom of the shallow end, and the third group having the widest spacing laying on the bottom of the shallow end adjacent the outlet or discharge end thereof. The aeration tubing that is suspended above the bottom in the deep end should have a lead keel giving the tubing an over-all density approximately the same as that of the fluid in which it is submerged. In this connection the tubing which lies on the bottom will have a greater density so that it will lie in place.

A feature of the invention is to have all of the cross tubing submerged to the same level. Since the cross tubing lies on the bottom of the shallow end, it must be supported off from the bottom at the deep inlet end. This arrangement can be readily accomplished in the following manner.

A number of posts, such as wooden telephone poles, are driven into the inlet end in three rows as indicated at 53—53, 54—54 and 55—55. Header feeder pipes 56 and 57 extend along opposite sides of the pond 50. In the deep end these header pipes 56 and 57 are suitably secured or tied to and supported by the posts 53 and 55, respectively. In the center an elongated support pipe 58 (not a header) is supported on the posts 54 at the same level as the header pipes 56 and 57.

Oil-less compressors 60—60 on opposite sides of the pond have their discharge connections connected by conduits 61 to the header feeder tubes 56 and 57 extending along the inner walls of the pond. The ends of the hydraulically defined cells established by cross lengths of submerged tubing 62—62 are closed off by the longitudinally extending hydraulic curtains established above the elongated lengths 63 and 64 of submerged flexible tubing with slit valves connected to the opposite ends of the header feeder tubes 56 and 57, respectively, as shown.

In the deep end of lagoon 50 where the cross tubing is supported well above the lagoon bottom a desirable arrangement for installing the tubing and keeping it taut is to have the individual lengths extend inwardly from the respective headers 56 and 57 to just beyond the center support pipe, and then to attach weights 59 (FIG. 6) to the inner ends and allow them to hang down on opposite sides of pipe 58 as shown. The weights will serve to hold the lengths of tubing down and keep them straight and taut.

Preferably the inlet pipe 51 is arranged so that its discharge end is approximately 2 or 3 inches below the aerating tubing 62 which is suspended below the surface of the lagoon at the same depth as the bottom of the shallow end, e.g. 14 feet. As a result of this arrangement all of the water in the lagoon to the depth of the shallow end, e.g. 14 feet is compartmented or divided by the lengths of cross tubing 62 into the series of hydraulically defined aerating cells as described above in connection with FIGS. 1 and 2. However, in the deep end of the lagoon underneath the aerating tubing 62 the water will not be aerated but will be in the anaerobic condition. Thus, the deep end of the pond or lagoon 50 is horizontally divided into an upper aerobic layer and a lower anaerobic layer. The interface between these layers is maintained because the bottom layer is relatively quiescent and denser whereas the upper layer is undergoing continuous hydraulic circulation and is lighter.

Figure 5:
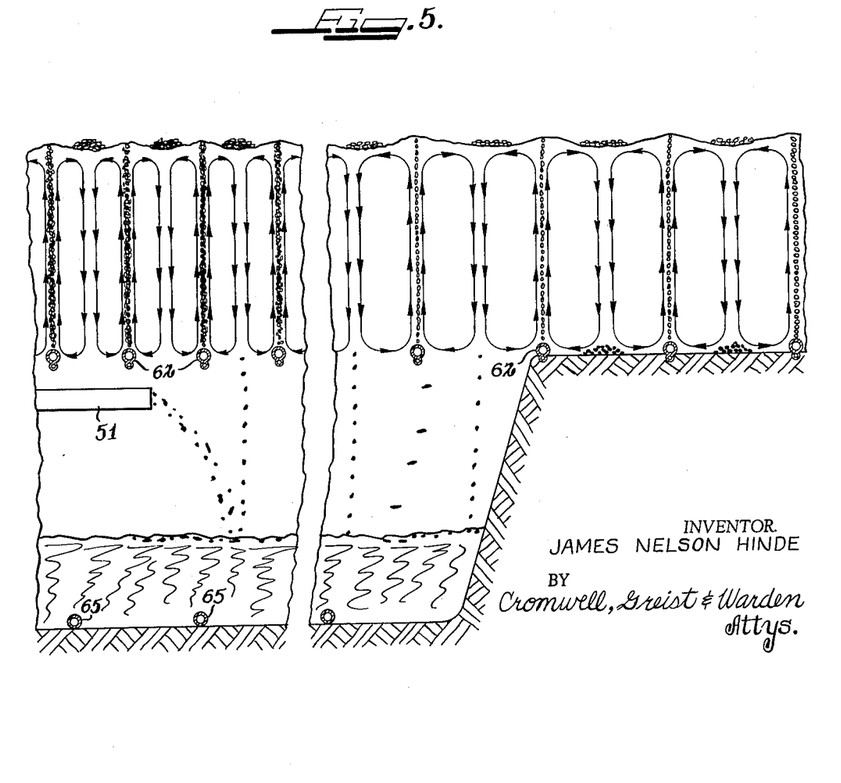
FIG. 5 is a fragmentary vertical section taken on line 5—5 of FIG. 4.

In operation, the heavier solids in the effluent settle to the bottom as indictaed in FIG. 5 where they form a deposit which undergoes anaerobic digestion. Lighter solids float to the surface and are digested aerobically, with the solids of aerobic digestion settling down into the anaerobic layer.

In the top aerobic layer, aerobic bacteria are produced which (both dead and alive) settle down through the anaerobic layer. These created solids carry a different electrical charge from the solids in the anaerobic layer and hairy character which make them excellent settling agents which help to settle the solids in the anaerobic layer. These created solids which settle are a by-product of aerobic reaction and save adding costly settling agents.

One of the products of anaerobic digestion is methane gas. This gas is only very slightly soluble in water and will pass up through the aerobic layer and escape through the surface without creating any objectionable odor. Other products of anaerobic digestion are hydrogen sulfide gas, organic acids, etc., which would cause odors but are soluble in water. Hence, as they rise through the aerated layer above the tubing 62 they are aerobically digested and cause no odors.

Solids from the anaerobic layer will often fill with gases and rise to the surface as scum. However, in rising through the aerobic layer with a fast circulation rate in the individual cells, such solids are broken down into small solids, degasified or aerobically digested so that they will again settle to the bottom. The hydraulically defined cells in the deep end are diagrammatically illustrated in FIG. 5 and are of narrow and intermediate width.

In this combined aerobic-anaerobic treatment it is not necessary to completely break down the organic solids provided they settle in the bottom of the anaerobic layer. It may be desirable to add settling agents to help precipitate the solids faster and to densify them. If the aerobic pit is not deep enough to accommodate a sufficient accumulation of solids, it may be desirable to install a plastic heating coil as indicated at 65 in the bottom of the settling pit. After the solids have accumulated to a depth that heat will not be lost too rapidly to the liquid above, the heat may be turned on and the solids in the bottom heated to a temperature of about 100° F. which causes fast anaerobic digestion whereby the solids can be removed with less odor problems. However, it is not practical to heat the liquid layer above the solids to any appreciable degree. In most cases where only a small pit is available for sludge accumulation, the sludge should be removed at regular intervals and sent to a conventional digester or disposed of by conventional means. In areas where sufficient land is available, an acre of land in the form of a deep pit could accumulate the sludge from 10,000 people for approximately 50 years without requiring sludge removal.

In cases of industrial waste with high BOD, it may be necessary to put a basin or pit in the center of the shallow end or polishing lagoon to collect aerobic sludge to pump back to the surface of the inlet cells which are operating over the anaerobic layer. This gives dilution to these cells and helps build up areobic bacteria.

After the waste leaves the deep portion or inlet end of the pond or lagoon 50 by passing from one cell to another, it then must go to the shallow portion for polishing, i.e. final treatment. This shallow portion could be a separate lagoon, or part of the same lagoon as shown in FIG. 4. One of the main reasons for this is the necessity that solids are rising from the aerobic lagoon and these solids must be digested or settled out before they reach the effluent discharge 52.

Aerobic-anaerobic digestion is more desirable than aerobic digestion alone where a deep lagoon can be built since it requires much less land and requires much less compressed air, since a good portion of the digestion is done anaerobically. The sludge is much denser requiring less space for storage. On domestic sewage, one acre of deep lagoon and one acre of shallow lagoon for polishing can take care of 4,000 people with about 50% the quantity of compressed air used in an aerobic lagoon.

The ability to readily divide a deep body of water horizontally into an upper aerated layer containing a series of transverse hydraulic treatment cells and a lower quiescent layer as described above in connection with FIG. 4 may be used to advantage in connection with a sludge setling tank installation indicated generally at 70 in FIG. 7. The tank 70 disirably may be formed of concrete with vertical side walls 71 and 72 and a V-shaped bottom 73 equipped with a conveyor screw 74. Header feeder pipes 75—75 are suitably disposed along the insides of the vertical walls 71 and 72 to a desired depth, e.g. 10 feet. Parallel lengths of weighted flexible cross tubing 76 having slit valves therein extend between the header feeders 75 as described above for example in connection with the sewage lagoon 5 in FIG. 1. The cross tubing 76 will be spaced on uniform centers. The header feeders 75 are supplied with oil-free air by the oil-less compressors 77—77 suitably mounted on brackets or supports 78—78. Conduits 80—80 connect the discharge connection of the blowers of compressors 77 with the header feeders 75.

Sludge may be brought into the tank 70 through an inlet pipe 81 at a level somewhat below the upper aerated layer. A body of settled sludge is indicated at 82 in the lower portion of the tank 70 and the discharge or inlet pipe 81 should be disposed above the top surface of the sludge 82. Heavier solids will settle out into the layer 82 while lighter solids will float into the aerated layer above the cross tubes 76 wherein they will be digested aerobically, or made heavier so that they will settle into the sludge layer 82. The upper portion of the body of sludge 82 is not very dense and will usually contain only 3 to 5% solids. Deeper down in the body of sludge 82 it becomes denser so that at an intermediate depth the sludge concentration or density may be 6 to 8% solids while at the very bottom the density may be 9 to 11% solids. It will be understood that the density of the body of sludge 82 at various depths is dependent upon the depth of the sludge, the time for impaction, the type of sludge, and certain other factors. With most sludges a 9 to 11% solids density or concentration can be obtained with a 40 foot depth of sludge in a reasonable length of time. Higher percent solids concentrations can be obtained with greater depths and/or longer retention times. For example, in sludge lagoons of 20 foot depth, the bottom sludge has been known to obtain a 16 to 18% solids concentration after several years of compaction. At such concentrations the sludges are capable of being wet-burned in the Zimmerman process and used to produce power. Sludge digestors can produce excess gases for power and it is practical to burn dense sludge directly to produce power. Such periods of settling time would normally not be permitted due to odor nuisance. However, because the odors are sealed in by the aerobic layer herein retention times are no longer a problem and the sludges can be compacted over prolonged periods.

The screw conveyor 74 may be operated continuously or intermittently, as desired, in known manner to bring the densified sludge from the settling tank 70 to one end of the tank for removal after the sludge reaches the correct solids content. The aerated effluent is discharged from the settling tank 70 at the end opposite the inlet pipe 81 through a discharge outlet indicated at 83, and if desired, it may be sent to polishing lagoon or discharged back through the treatment plant or otherwise disposed of. The aeration cells in the upper aerated layer above the cross tubing 76 not only prevent odors from reaching the surface but they also help to precipitate scums which rise from the anaerobic layer. A retention time of 1 to 4 days will usually be required in the upper aerated layer and the anaerobic liquid layer immediately below, depending on the nature of the solids to be settled. Preferably, the upper aerated or oxygenated layer should be from 10 to 14 feet deep. The spacing of the aeration tubing 76 can vary from a few inches up to 5 feet depending upon how much hydrogen sulfide, organic acids, and other impurities are being passed up from the anaerobic layer. Settling agents and/or pH control agents can be added or used to treat the influent for better precipitation of solids as is known in the art. The installation shown in FIG. 7 is particularly useful in the treatment of raw waste with heavy solids or where the influent contains impurities that can be readily chemically precipitated.

Where settled sludge discharged from conveyor 74 is used either in the Zimmerman process in the direct combustion of sludge, or in digesters where it is desirable to use excess gas for heat, it would be more desirable to have a very deep sludge compartment for compacting so that a short time is required and excess breakdown of organic matter does not occur which gives a higher B.t.u. for the settled sludge. In these deeper sludge compartments it is desirable to have single valves releasing air approximately two feet above the screw 74, and on approximately 10 foot centers to create small diameter fluid tubes going up to the liquid layer which will allow trapped water to flow back up to the water layer.

Figures 8, 9, 13:
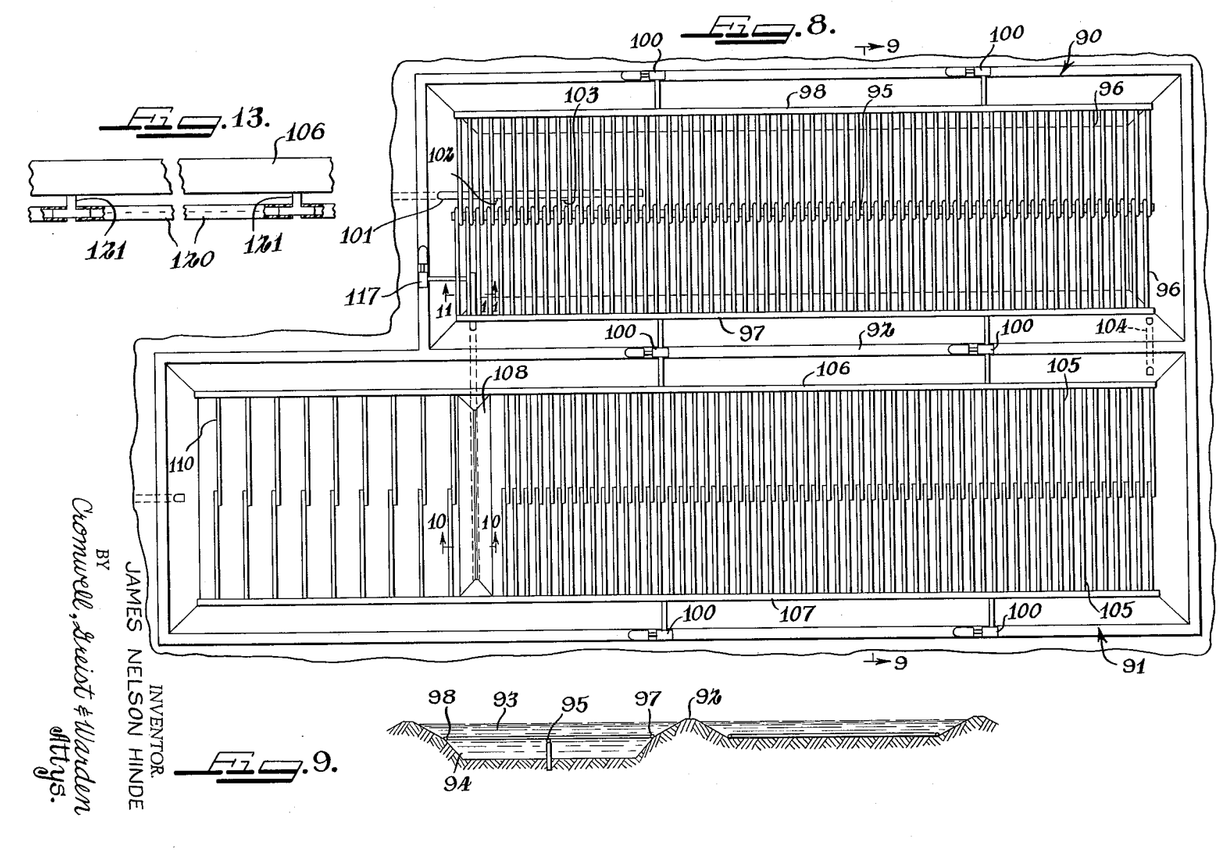
FIG. 8 is a top plan view of an installation especially suited for treatment of high BOD industrial waste wherein the influent is discharged into a lagoon horizontally divided into aerobic and anaerobic layers and transferred from the opposite end thereof into an aerated shallower lagoon having a sludge removal trough and a polishing pond end.
FIG. 9 is a transverse sectional view taken on line 9—9 of FIG. 8.
FIG. 13 is a detail view in connection with the embodiment of FIG. 8.

One waste treatment requirement frequently encountered is the economical treatment of high BOD industrial waste, e.g. from 2000 to 4000 BOD. The installation shown and illustrated in FIGS. 8–11 is particularly well suited to treat this type of waste. Referring to FIGS. 8 and 9, the installation shown therein comprises a deep lagoon indicated generally at 90 and a shallower, somewhat longer lagoon 91 extending alongside, with a common separating wall of earth or other material indicated at 92 in FIG. 9. The lagoon 90 may desirably contain liquid a depth of 20 feet and be divided into an upper aerobic layer 93 and a lower anaerobic layer 94. Typically, the lagoon 90 may have an overall length of 892 feet and an overall width of 388 feet measured to the center of the dividing wall 92. The flexible tubing for aeration in the lagoon 90 may be installed as described above for the flexible tubing in the deep end of the lagoon 50 in FIG. 4. That is, there will be a center support 95 over which the ends of the links of cross tubing 96 with slit valves may be hung and held taut by weights suspended on the free ends thereof. Suitable header pipes 97 and 98 will be supported along the opposite sides of the lagoon 90 at the proper level and supplied with compressed air from the oil-less compressors indicated at 100—100.

Desirably, the cross tubing will be placed on two foot centers throughout the entire length of the lagoon 20. The inlet pipe 101 for bringing in the industrial waste influent may extend into the lagoon to a distance of 250 feet and be provided with intermediate discharge openings 102 and 103, in addition to the end opening. Liquid from the aerated upper layer in lagoon 90 discharges into the lagoon 91 through a transfer tube 104 (FIG. 8). In the lagoon 91, which may have a liquid depth of 10 feet, the cross tubing 105 in the main body of this lagoon may also be spaced on 2 feet centers and it will lie on the lagoon bottom and be supplied with compressed air from the header feeders 106 and 107 suitably connected to four of the oil-less compressors 100. The left end (as viewed in FIG. 8) of the lagoon 91 is divided from the main portion of this lagoon by a settling ditch or trough which is indicated generally at 108. The portion of the lagoon to the left of the trough 108 constitutes a polishing pond in which the transverse lengths of cross tubing 110 are desirably on 20 foot centers.

A tapered pipe 111 (FIGS. 8 and 10) is disposed in the very bottom of the trough 108 which trough may have a depth of 20 feet. On its outer end the pipe 111 may have a diameter of 6 inches while at its larger end where it passes through the common partition wall 92 it may have a diameter of 3 feet. After leaving the trough 108 the pipe 111 has a uniform diameter and extends all the way into the inlet end of the lagoon 90 as indicated. In its upper surface the pipe 111 is provided with a plurality of inlet openings 109, which may have diameters of say 4 inches, so that sludge settling into the bottom of the trough 108 may be taken into the interior of the pipe 111.

The purpose of the pipe 111 is to transfer sludge from the lagoon 91 into the inlet end of the lagoon 90. In order to produce such a flow of sludge, the discharge end of the pipe 111 in the lagoon 90 is provided with an air lift for a portion of its length (e.g. the last 20 feet) as shown in FIG. 11. For this length of 20 feet, the pipe 111 is provided with a continuous slot 113 and board baffles 114 and 115 may be built up along opposite sides of the slot to a depth just below the top of the upper aerated layer in the lagoon 90. In order to produce a pumping or lifting effect within the 20 foot length having the slot 113 a series of lengths of the flexible tubing 116 with slit valves in their upper surfaces are supported in known manner and suitably supplied with compressed air from a compressor indicated at 117 in FIG. 8. The upward flow of liquid between the board baffles 114 and 115 over the slot 113 will serve to provide a pumping effect which introduces the activated sludge into the inlet end of the lagoon 90. The air introduced from the tubing 116 not only produces the lifting or pumping effect but also adds oxygen to reactivate the sludge drawn in from the bottom of the trough 108 in the lagoon 91.

By recirculating activated sludge and treated water from lagoon 91 in the manner described it is possible to dilute the BOD of the influent introduced into the lagoon 90 to a substantial amount, e.g. from 2000–4000 BOD down to 400 BOD. An installation of the size and type indicated in FIGS. 8 and 9 can be used to process or treat industrial sludge at the rate of 8000 BOD per day. This is equal to a population equivalent of 48,000 people.

In lagoons 90 and 91 the opposite ends of the hydraulically defined cells created above the cross tubing pattern, may be closed off by elongated curtains provided by a series of relatively short lengths of weighted flexible tubing 120 (FIG. 13) connected to, and extending alongside, the various header pipes (e.g. header pipe 106). In this arrangement T-connections 121—121 will project from the side of the header pipes at suitable intervals, and lengths 120 of the weighted flexible tubing slit valves in the top will be slipped over the laterally projecting ends of these T fittings as shown.

It will be noted in FIG. 8 that the lengths of cross tubing 105 and 110 in lagoon 91 extend inwardly from the headers 106 and 107 and then terminate in the center of the lagoon after overlapping somewhat. This represents a preferred arrangement in certain installations. The inner ends of the cross tubes 105 and 110 will be closed and with this arrangement it is a simple and convenient operation to either inspect or clean the cross tubing by simply lifting the tubes by their free inner ends to the surface of the pond. This can be done without either disturbing the normal operation of the pond or having to drain it.

In certain embodiments of the invention illustrated and described above (e.g. FIGS. 4 and 6, and FIG. 8) arrangements have been shown in which the lengths of aerating tubing are supported off the bottom of a lagoon or pond with the lengths being connected with parallel header feeders on opposite banks and having their inner ends draped over a center longitudinal support pipe or rod and held taut by weights. In FIG. 14 an alternate arrangement is shown wherein there is a header feeder pipe 125 which extends longitudinally down the center of a lagoon and which is suitably supported on a row of posts 126. The header 126 has nipples 127 projecting along opposite sides thereof over which may be slipped the inner ends of lengths 128—128 of weighted flexible tubing having the self-closing slit valves in the tops thereof. The opposite or outer ends of the lengths of tubing 128 are closed and each suitably connected to one end of a coil spring 130. Each spring 130 has its out end hooked over the appropriate hook 131 of a series of hooks screwed into the top of a wooden plank or other support 132 extending along the bank of the lagoon or pond at the proper level. It has been found that a twenty-pound spring normally serves adequately to hold flexible tubing of ½ inch diameter taut in this manner.

It will be understood that the various embodiments of the invention described above in connection with the accompanying drawings are illustrative of a variety of other installations and embodiments that may be made utilizing the same principles, and the same or similar apparatus and equipment. It is obvious from the foregoing that installations in accordance with the present invention are highly flexible.

I claim:

1. The method of aerating a body of aqueous liquid which comprises releasing oxygen-containing gas into said body from a plurality of submerged flexible conduits having a narrow row of self-closing slit valves in the upper portions thereof for substantially the full length of each conduit and arranged in a pattern wherein said conduits extend substantially straight and parallel with each other, said oxygen-containing gas being released through said slit valves in bubble form along the length of each conduit in such manner that the diameters of the majority of bubbles do not exceed approximately ⅛ inch so as to produce upward laminar flow of a curtain of aerated liquid above said conduits with each such curtain parting at the surface so as to form downward recirculation of the liquid intermediate each of said curtains whereby said body is divided into a series of parallel hydraulically defined cells, said self-closing slit valves being spaced sufficiently close together in said narrow rows as to release streams of said bubbles which are close enough together to produce said upward laminar flow.

2. The method of claim 1 wherein said pattern includes at least two groups wherein the spacing of the submerged flexible conduits in each group is uniform but the spacing is different in different groups whereby the corresponding hydraulic cells are of uniform width within each group but the width thereof is different in different groups.

3. The method of claim 2 wherein the bubbles are released from said different groups of conduits in different manners so that there is variation between the velocities of circulation in said different groups of hydraulic cells.

4. The method of claim 1 wherein at least some of said conduits rest on the bottom of said body of aqueous liquid.

5. The method of claim 1 wherein at least some of said conduits are supported above the bottom of said body of aqueous liquid.

6. The method of claim 1 wherein each series of opposite ends of said hydraulic cells is closed off by a curtain of aerated water created by the release of bubbles with upward laminar flow from an elongated flexible conduit having self-closing slit valves in the upper portion thereof.

7. The method of claim 1 wherein said body of aqueous liquid has an inlet and outlet and has a current flow therebetween.

8. The method of claim 1 wherein said body of aqueous liquid is formed by waste water selected from the group consisting of domestic sewage, industrial waste, effluent from an activated sludge treatment plant, and effluent from a trickling filter treatment plant.

9. The method of claim 1 wherein a portion of the BOD and inorganic nutrients of said body of aqueous liquid is utilized to promote aquatic insect life which is consumed by animal life and the latter is cropped.

10. The method of aerating an elongated body of aqueous liquid having an influent inlet adjacent one end and an effluent outlet adjacent the opposite end, which comprises releasing oxygen-containing gas into said body from a plurality of submerged flexible conduits having a narrow row of self-closing slit valves in the upper portions thereof for substantially the full length of each conduit and arranged in a pattern wherein said conduits are substantially straight and parallel and extend transversely to the long direction of said body, said oxygen-containing gas being released through said slit valves in bubble form along the length of each conduit in such manner that the diameters of the majority of bubbles do not exceed approximately ⅛ inch so as to produce upward laminar flow of a curtain of aerated liquid above each conduit with each such curtain parting at the surface so as to form a downward recirculation of the liquid intermediate each of said curtains whereby said body of liquid is divided into a series of parallel hydraulically defined cells transverse to the length of said body, the current flow of liquid between the inlet and outlet ends being insufficient to interfere with said pattern of transverse hydraulic cells, and the upward laminar flow of at least those hydraulic curtains adjacent said inlet being sufficient to trap relatively large solid particles within said cells while allowing only fines to leak through said hydraulic curtains from cell to cell, said self-closing slit valves being spaced sufficiently close together in said narrow rows as to release streams of said bubbles which are close enough together to produce said upward laminar flow.

11. The method of claim 10 wherein said transverse cells are relatively narrow adjacent said inlet, are relatively wide adjacent said outlet and have intermediate widths in the intermediate portion of said body of liquid, and wherein circulation is fastest in said narrow cells, is slowest in said wide cells, and has intermediate velocity in said intermediate cells.

12. The method of treating a body of aqueous liquid containing materials subject to both anaerobic and aerobic digestion which comprises releasing air or oxygen-containing gas into said body from a plurality of flexible conduits having self-closing slit valves in the upper portions thereof and submerged at an intermediate depth therein and arranged in a pattern wherein said conduits extend substantially straight and parallel to each other, said air or oxygen-containing gas being released in bubble form along the length of each conduit in such manner as to produce upward laminar flow of a curtain of aerated liquid above each conduit with each such curtain parting at the surface so as to form downward recirculation of liquid intermediate each of said curtains to the depth of said conduits whereby said body of liquid has a bottom unaerated layer below said conduits in which anaerobic digestion occurs and an upper aerated layer above said conduits which is divided into a series of parallel hydraulically defined cells in which aerobic digestion occurs.

13. The method of treating a body of aqeuous liquid having an influent inlet at one end and an effluent outlet at the opposite end with the liquid adjacent said inlet being substantially deeper than it is adjacent said outlet, which method comprises releasing air or oxygen-containing gas into said body from a plurality of submerged flexible conduits having self-closing slit valves in the upper portions thereof and arranged in a pattern wherein said conduits are substantially straight and parallel and extend transversely of the direction of flow of liquid from said inlet to said outlet with the conduits in said deep end being spaced substantially above the bottom and with the conduits in the shallow end being disposed on or adjacent to the bottom, said air or oxygen-containing gas being released in bubble form along the length of each conduit in such manner as to produce upward laminar flow of a curtain of aerated liquid above each conduit with each such curtain parting at the surface so as to form downward recirculation of liquid intermediate each of said curtains to the depth of said conduits whereby said body of liquid has a bottom unaerated layer below said conduits in said deep end in which anaerobic digestion occurs and solids settle and an upper aerated layer in both said deep and shallow ends which is divided into a series of parallel hydraulically curtained off cells in which aerobic digestion occurs.

14. The method of treating a flowing stream of aqueous liquid waste having a relatively high BOD and confined in an elongated flow path extending between an influent inlet and a polished effluent outlet and having a sludge settling pocket intermediate said inlet and outlet, which method comprises releasing oxygen-containing gas into said body from a plurality of submerged flexible conduits having a narrow row of self-closing slit valves in the upper portions thereof for substantially the full length of each conduit and arranged in a pattern wherein said conduits are substantially straight and parallel extending transversely to the direction of flow, said oxygen-containing gas being released in bubble form along the length of each conduit in such manner that the diameters of the majority of bubbles do not exceed approximately ⅛ inch so as to produce upward laminar flow of a curtain of aerated liquid above each conduit with each such curtain parting at the surface so as to form downward recirculation of liquid intermediate each of said curtains to the depth of said conduits whereby said body above said conduits is divided into a series of parallel hydraulically defined cells both upstream and downstream of said sludge settling pocket, and withdrawing sludge from said sludge settling pocket and introducing said withdrawn sludge into said body adjacent said influent inlet, said self-closing slit valves being spaced sufficiently close together in said narrow rows as to release streams of said bubbles which are close enough together to produce said upward laminar flow.

15. The method of claim 14 wherein said body of liquid is substantially deeper adjacent said influent inlet than for the remainder of its flow path with said submerged flexible conduits being spaced substantially above the bottom adjacent said influent inlet where said body of liquid is deeper, and with the deeper liquid below said conduits constituting a lower layer in which settling and anaerobic digestion occurs.

16. The method of claim 14 wherein said submerged conduits downstream from said sludge settling pocket are relatively widely spaced whereby the velocity of circulation in each of said hydraulic cells thereover is relatively slow and conducive to settling of fine solids and polishing of said liquid.

17. An installation for aerating a flowing body of aqueous liquid which comprises, a plurality of lengths of weighted flexible tubing having a narrow row of self-closing slit valves in the upper portions thereof for substantially the full length of each conduit submerged to a predetermined depth in said body and arranged in a pattern wherein said lengths are substantially straight and parallel with each other and extend generally transversely to the direction of flow, and means for supplying each of said lengths with compressed air under sufficient pressure to open said slit valves and release air bubbles therethrough not exceeding approximately ⅛ inch in diameter which collectively produce upward laminar flow of a curtain of aerated liquid above each of said lengths of tubing with each such curtain parting at the surface so as to form downward recirculation of the liquid intermediate each of said curtains whereby said body is divided into a series of parallel hydraulically defined cells, said self-closing slit valves being spaced sufficiently close together in said narrow rows as to release streams of said bubbles which are close enough together to produce said upward laminar flow.

18. The installation of claim 17 wherein said pattern includes at least two groups of said lengths of tubing based on the different spacing between the lengths comprising each group.

19. The installation of claim 17 wherein at least a portion of said lengths of tubing rest on the bottom over which said body of liquid flows.

20. The installation of claim 17 wherein at least a portion of said lengths of tubing are supported above the bottom of said body of liquid.

21. In a sewage or industrial waste treating lagoon of elongated rectangular shape and uniform depth having an influent inlet at one of the narrow ends and an effluent outlet adjacent the opposite end, means for aerating the body of waste flowing through said lagoon, comprising, a plurality of lengths of weighted flexible tubing having a narrow row of self-closing slit valves in the upper portions thereof for substantially the full length of each conduit and resting on the bottom of said lagoon and arranged in a pattern wherein said lengths are substantially straight and parallel with each other and extend generally transversely to the length of said lagoon, compressed air header means communicating with said lengths of tubing, and compression means, said self-closing slit valves serving to release bubbles the diameters of the majority of which do not exceed ⅛ inch in diameter and said slit valves being spaced sufficiently close together in said narrow rows as to release streams of said bubbles which are close enough together to produce upward laminar flow above each length of conduit.

22. In a sewage lagoon installation having an inlet and outlet with at least the inlet end sufficiently deep to be horizontally divided into an upper aerated layer and a lower anaerobic layer, the improvement which comprises means for creating said upper aerated layer and establishing the interface between said upper and lower layers comprising a plurality of lengths of submerged flexible tubing having self-closing slit valves in the upper portions thereof extending substantially straight and parallel in a direction transverse to the direction of liquid flow in the lagoon, means for supporting said lengths at a predetermined level whereat it is desired to establish said interface between layers, and means for supplying compressed air to said tubing under sufficient pressure to emerge as bubbles through said slit valves and create curtains of aerated liquid having upward laminar flow above each length of tubing which curtains part at the surface and form downwardly directed currents thereby dividing said upper layer into a series of adjacent hydraulic cells.

23. The improvement called for in claim 22 wherein at least said inlet end has a depth substantially exceeding the combined depths of said upper and lower layers with the depth thereof below said lower anaerobic layer containing settled solids.

24. In a sewage lagoon installation having an inlet and outlet with a deep portion adjacent said inlet and a shallow portion adjacent said outlet, the improvement which comprises, means for creating an upper aerated layer extending from said inlet to said outlet and having a substantially uniform depth equal to the depth of said shallow end with the liquid in said deep portion under said aerated layer being a relatively quiescent anaerobic layer, said means comprising a plurality of lengths of submerged flexible tubing having self-closing slit valves in the upper portions thereof extending substantially straight and parallel in a direction transverse to the direction of liquid flow in the lagoon, said lengths of tubing in said shallow outlet portion resting on the bottom thereof with means for supporting said lengths of tubing in said deep inlet end to a depth approximately equal to the depth in the shallow end, and means for supplying compressed air to said tubing under sufficient pressure to emerge as bubbles through said slit valves and create curtains of aerated liquid having upward laminar flow above each length of tubing which curtains part at the surface and form downwardly directed currents thereby dividing said upper layer into a series of adjacent hydraulic cells.

25. In a sewage lagoon installation having an inlet end an an outlet end the improvement which comprises a plurality of submerged lengths of flexible tubing having a narrow row of self-closing slit valves in the tops thereof for substantially the full length of each conduit and extending substantially straight and parallel to each other in a direction transverse to the current flow through said lagoon, means for supplying compressed air to said lengths of tubing under sufficient pressure to emerge in bubble form through said slit valves and create curtains of aerated liquid having upward laminar flow above each length of tubing which curtains part at the surface and form downwardly directed currents thereby dividing the liquid above said tubing into a series of adjacent hydraulic cells, said lagoon installation having a sump formed in the bottom thereof intermediate said ends, and removal means for transferring sludge settled into said sump into said inlet end, said self-closing slit valves serving to release bubbles the diameters of the majority of which do not exceed ⅛ inch in diameter and said slit valves being spaced sufficiently close together in said narrow rows as to release streams of said bubbles which are close enough together to produce upward laminar flow above each length of conduit.

26. The improvement of claim 25 wherein said lagoon installation comprises at least two separate lagoons with conduit means interconnecting the discharge end of each lagoon with the inlet end of each succeeding lagoon.

27. The improvement of claim 25 wherein said lagoon installation comprises a first lagoon which is relatively deep with said tubing therein horizontally dividing the liquid contents therein into an aerated upper layer having said adjacent hydraulic cells and a lower anaerobic layer.

28. The improvement of claim 25 wherein said sump is in the form of a transverse ditch and said sludge removal means comprises a relatively large diameter conduit having a tapered portion disposed in the bottom of said ditch and a non-tapered portion extending into said lagoon inlet end, said tapered portion having sludge inlet openings in the upper portion thereof with the larger end connecting with said non-tapered portion, said non-tapered portion having a discharge end within said lagoon inlet end which discharge end has a longitudinal slot formed in the top thereof, baffle means defining a vertical channel above said elongated slot, an additional plurality of parallel lengths of flexible tubing with self-closing slit valves in the tops thereof disposed over said slot and adjacent thereto, and means for supplying compressed air to said additional lengths of tubing for discharging as bubbles through said slit valves and aerating the liquid in said vertical channel and thereby create lifting action which sucks sludge from the bottom of said ditch and discharges it from the top of said vertical channel.

29. The installation of claim 17 wherein at least a portion of said lengths of tubing rest on the bottom over which said body of liquid flows and have closed free ends whereby they may be lifted to the surface for inspection or cleaning.

30. The installation of claim 17 wherein at least a portion of said lengths of tubing are supported above the bottom and are held taught by weights or springs connected to closed ends thereof.

31. The method of claim 12 wherein hairy settling solids are naturally created in said upper aerated layer and settle down into said bottom unaerated layer carrying solids therewith.

32. The improvement called for in claim 22 wherein at least said inlet end has a depth substantially exceeding the combined depths of said upper and lower layers with the depth thereof below said anaerobic layer containing settled solids and means for releasing bubbles of air at spaced intervals adjacent the bottom of said settled solids for allowing water to rise to the surface along the paths created by said bubbles.

33. The method of polishing a slowly flowing body of effluent discharged from a conventional primary or secondary waste treatment plant confined in an elongated flow path extending between an inlet and an outlet, which method comprises releasing air or oxygen-containing gas into said body from a plurality of submerged flexible conduits having slit valves in the upper portions thereof and arranged in a pattern wherein said conduits are substantially straight and parallel extending transversely to the direction of flow, said air or oxygen-containing gas being released in bubble form along the length of each conduit in such manner as to produce upward laminar flow of a curtain of aerated liquid above each conduit with each such curtain parting at the surface so as to form downward recirculation of liquid intermediate each of said curtains to the depth of said conduits whereby said body above said conduits is divided into a series of parallel hydraulically defined cells, oxygen being introduced into the cells adjacent said inlet in such manner that the oxygen content therein is rapidly increased for the production of bacteria, small visible insects and algae, oxygen being introduced into cells intermediate said inlet and outlet in such manner as to produce slow circulation of the contents thereof with the oxygen content therein sufficiently high to promote visible insect life which feeds on both bacteria and algae, and oxygen being introduced into the cells adjacent said outlet in such manner as to produce slow circulation of the contents thereof with the oxygen content therein sufficiently high for maintaining minnow life which controls both algae and inesct life, and removing minnows from said body, said algae removing inorganic nutrients from said influent, said insects feeding on and consuming said algae, and said minnows consuming said insects and algae.

References Cited by the Examiner

UNITED STATES PATENTS

| 302,326 | 7/1884 | d'Heureuse | 261—212 |
| 1,247,540 | 11/1917 | Jones | 210—14 |
| 1,282,587 | 10/1918 | Jones | 210—220 X |
| 1,341,561 | 5/1920 | Jones | 210—220 XR |
| 2,417,519 | 3/1947 | Persson et al. | 61—1 |
| 2,822,329 | 2/1958 | Griffith | 210—14 |
| 3,063,689 | 11/1962 | Coppock | 261—124 |

FOREIGN PATENTS

| 24,974 | 8/1919 | Denmark. |
| 821,127 | 9/1959 | Great Britain. |

OTHER REFERENCES

Sewerage and Sewerage Treatment. Babbitt, Sixth Ed., 1947, John Wiley & Sons, Inc., N.Y., pp. 454, 464–470 and 475–479.

MORRIS O. WOLK, *Primary Examiner.*